United States Patent [19]

Rogerson et al.

[11] Patent Number: 5,022,676
[45] Date of Patent: Jun. 11, 1991

[54] AIR BAG ASSEMBLY AND METHOD THEREFOR

[75] Inventors: William E. Rogerson; Sean P. Donovan, both of Rochester Hills, Mich.

[73] Assignee: Allied-Signal Inc., Morris Township, Morris County, N.J.

[21] Appl. No.: 471,247

[22] Filed: Jan. 25, 1990

[51] Int. Cl.⁵ .............................................. B60R 21/20
[52] U.S. Cl. ..................................... 280/743; 280/728
[58] Field of Search ............... 280/743, 731, 732, 728

[56] References Cited

U.S. PATENT DOCUMENTS 3,907,330 9/1975 Kondo et al. ...................... 280/731

Primary Examiner—Kenneth R. Rice

[57] ABSTRACT

An air bag (60) employing a method of fabrication in which the air bag is placed in an initially folded configuration and thereafter compressed and/or heated in a manner that the air bag achieves a set such a reduced size or volume is achieved.

22 Claims, 2 Drawing Sheets

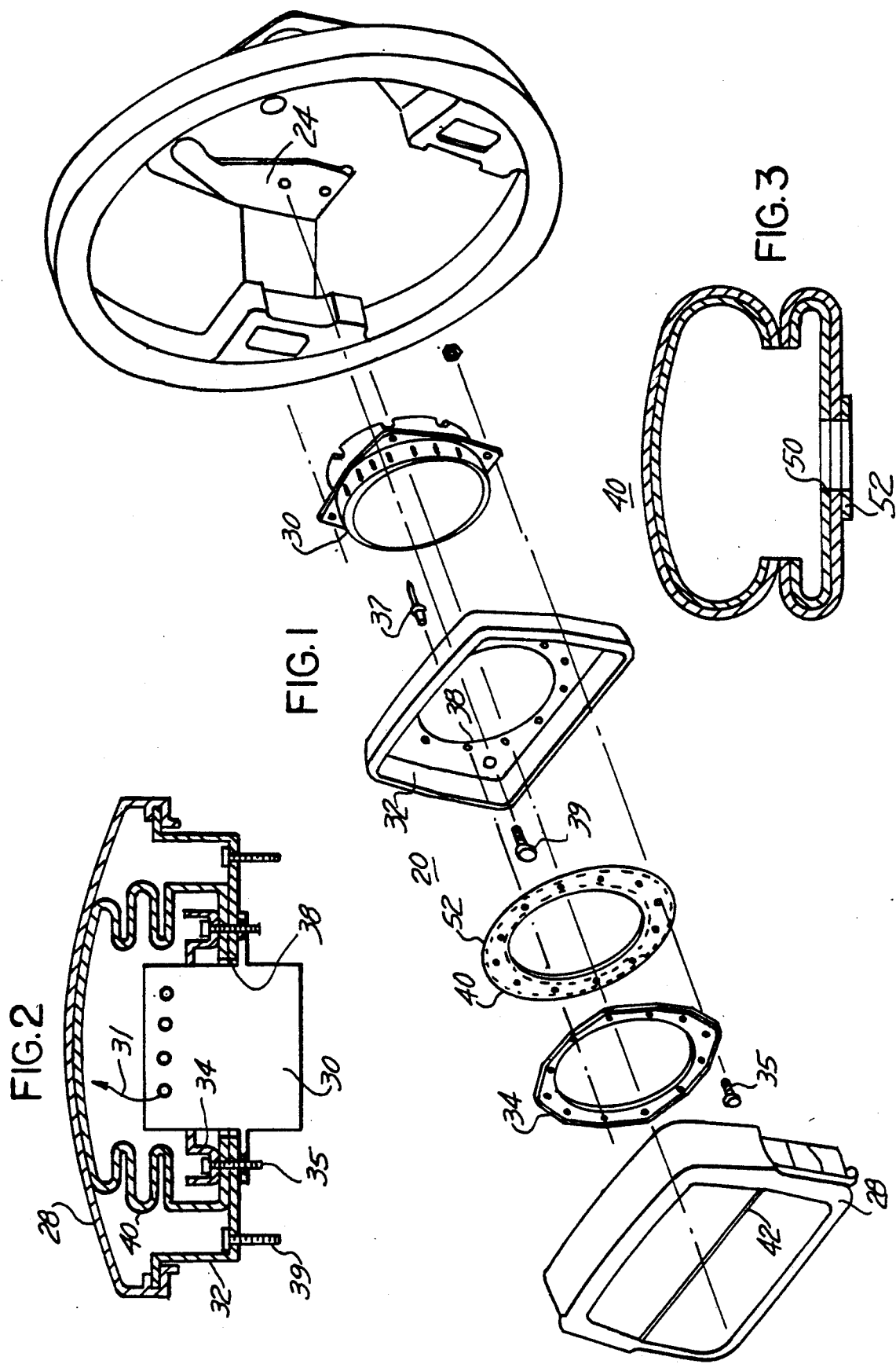

AIR BAG ASSEMBLY AND METHOD THEREFOR

BACKGROUND AND SUMMARY OF THE INVENTION

The present invention specifically relates to improvements in air bags for use in an occupant safety restraint system.

More specifically, the present invention relates to an air bag and air cushion assembly used within such system. While the present invention has direct application for use in a driver side air bag module, the invention is also suited for use in passenger side air bag modules.

FIG. 1 is illustrative of a typical air bag module or assembly 20 such as a driver side air bag module which is attached to the steering wheel 22. The steering wheel includes a bracket 24 for securing the module. The module comprises a decorative forward cover 28 and a housing 32 secured by various screws 35 and rivets 37. An air cushion 40 is positioned between a retaining ring 34 and housing 32, shown in greater detail in other FIGUREs. Only a small portion of the air bag is shown in FIG. 1. The front cover 28 is secured to the housing 32, or other component of the module 20 by any number of techniques and the housing is secured to the brackets by bolts 39. As an example, the cover 28, which is fabricated of a flexible plastic material, may include a circumferential groove 42 that snaps onto a flange 44 of the housing 32. A gas generator 30 may be attached to the housing 32 and extends partially therein. In operation and in response to a signal indicative of a crash situation, the gas generator 30 generates a quantity of inflation gas 31 which is communicated through an opening 38 in the housing 32 to the air cushion 40. In response to the inflation forces generated by the air cushion, the front cover 28, along predetermined tear lines 42, opens permitting the cushion to fully expand and protect the occupant. FIG. 2 schematically illustrates an assembled module. FIG. 2 also illustrates the folded cushion 40 positioned within its housing 32. FIG. 3 illustrates a cross-sectional view of a typical partially inflated cushion 40. The cushion having two portions sewn together at a peripheral seam, comprises an outer layer of woven nylon 46 coated with a layer of rubber 48. The nylon layer is typically constructed of nylon 6.6 or nylon 6 and the coating layer 48 is typically constructed of neoprene, silicone or polycarbonate. The air bag includes a central opening 50 about which are placed rings of rubber material 52, and nylon to reinforce the opening 50.

Methods of folding the air cushion 40 such that its folded size is able to fit within the housing 32 and front cover 28 are known in the art. Suffice it to say, the air cushion 40 is folded in an acceptable manner shown schematically in FIG. 2. During the process of folding the air bag 40 and attaching the decorative cover 28 thereabout, it is difficult to maintain the air bag in its folded shape since the air bag has a tendency to billow outwardly from the housing 32 requiring considerable effort to maintain the air cushion 40 in its folded orientation while the cover 28 is being attached to the module 20. In addition, because of the inherent springiness of the air bag or cushion 40 after assembly, the cushion 40 tends to outwardly deform the frontal area 56 of the cover creating a substantial bulge therein. This bulge is often referred to as "proudness". This proudness detracts from the appearance of current air bag modules and is objectionable to both the designer and the consumer.

It is an object of the present invention to provide an air bag module having an improved appearance. A further object of the present invention is to provide for efficiencies in the manufacture of air bag modules and in particular air cushions. A further object of the present invention is to provide an air bag module having a reduced size.

Accordingly the present invention comprises: a method, as well as the resulting air bag, of reducing the size of the air bag and associated module by applying a combination of pressure and heat to the air bag in its initially folded configuration in a manner to cause the air bag material to achieve a set.

Many other objects and purposes of the invention will be clear from the following detailed description of the drawings.

BRIEF DESCRIPTION OF THE DRAWINGS

In the drawings:

FIG. 1 illustrates an assembly diagram of a prior art air bag module.

FIG. 2 illustrates a cross-sectional view of a portion of a prior art air bag module.

FIG. 3 illustrates a typical driver side air bag.

DETAILED DESCRIPTION OF THE DRAWINGS

Figure 4:
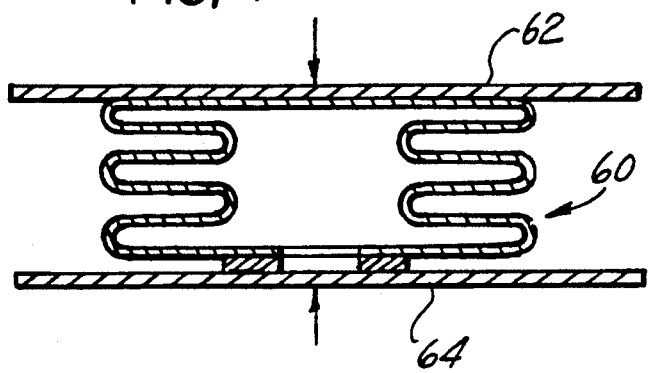
FIG. 4 illustrates a process step used in the present invention.

FIG. 4 illustrates a preliminary step in the fabrication of an improved air bag module in accordance with the present invention. There is shown an air bag or air cushion 60 identical to that shown in FIG. 3, folded into a generally compacted shape sufficient to fit within a cooperating housing such as 32. Many different folding techniques are known and used in the air bag art and as such, all should be applicable with the present invention. With the air bag in its initial folded configuration, the air bag is placed between two parallel surfaces, 62 and 64, and compressively loaded. It has been found that with compressive loads of approximately 14,090 Kg per square centimeter (10,000 pounds per square inch), the air bag fabric will take a relative permanent set, without a decrease in strength, such that upon removing the compressive load the folded air bag remains in a compact size, and the resulting volume or height of the folded air bag is reduced approximately 20%, sufficient to eliminate the proudness or bulging of the front cover 28 after final assembly. Subsequently, the retaining ring such as 34 would be fitted to the compressed air bag 60 and installed within its housing 32, the cover 28 attached and gas generator 30 attached. As can be appreciated from the above, since the height of the folded air bag 60 has been reduced, it is now also possible to use a narrower cover 28, thereby streamlining the appearance of the module 20. Alternatively, a larger air bag can be used within the original space requirements. Further, since the air bag material has achieved a set it is now possible to ship the folded/compressed air bag with ring as a separate subassembly for remote assembly.

A modification to the above process can be obtained by first installing the retaining ring 34 into the air bag 60 and then fitting the retaining ring and air bag into its cooperating housing 32. Thereafter the air bag 60 is folded in a manner to fit within the housing 32. A compressive load such as imparted by plate 62 to compress the air bag to its desired post-folding height. In this manner the housing 32 during this fabrication step acts as a lower die receiving the compressive load of a plate 62 (or upper die) as shown in FIG. 5.

Figure 5:
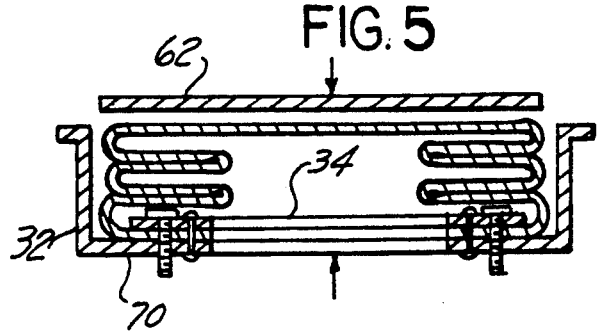
FIG. 5 illustrates an alternate process step of the present invention.
Figure 6:
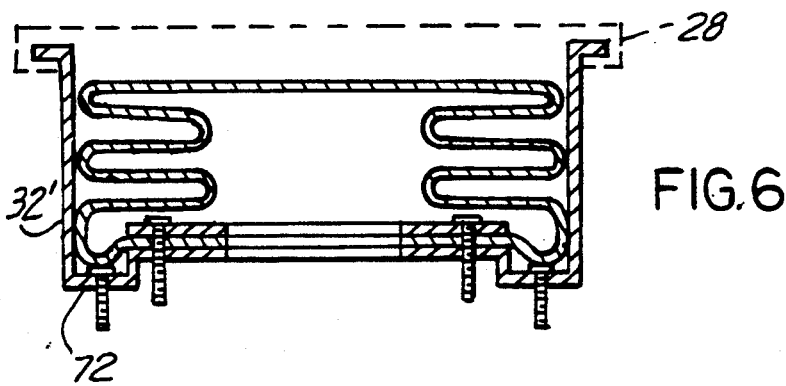
FIG. 6 illustrates another step.
Figure 7:
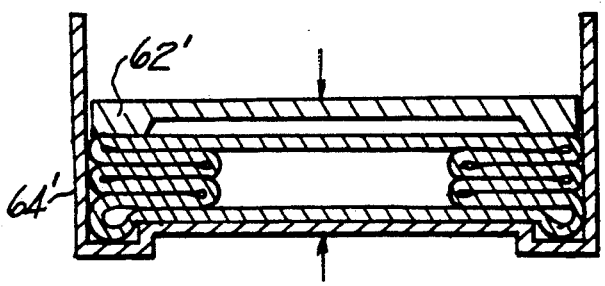
FIG. 7 illustrates another method of compressing an air bag.

It should be noted that the bottom 70 of the housings 32 shown in FIGS. 1,2 and 5 are substantially flat. A further reduction of the compacted height of the folded air bag may be achieved in certain situations by providing a recess 72 (annular or straight) in the bottom 70 of a housing such as 32', shown in FIG. 5. This recess would permit a certain amount of the folded air bag material to be fitted therein contributing to a further reduction of the overall height dimension of the cover, and hence the overall height dimension of the completely assembled module such as 20. To achieve a compacted air bag configuration which would have the shape of a housing such as shown in FIG. 6, it is contemplated that the folded air bag could be placed within a lower die 64' having a configuration similar to the shape of the bottom 70 of the housing 32. An upper die 62' conformal in shape with the lower die 64' is compressively loaded onto the initially folded air bag resulting in the air bag having a compressed configuration similar to that shown in FIG. 6.

The exact pressure profile used in compressing an air bag 60 may vary with the characteristic of the air bag material, that is, a coated material such as described in FIG. 3 may require a higher compressive load than a non-coated bag often used on a passenger side air bag module. It has been found that significant reduction in the volume or height of the compressed air bag can be achieved by applying the above compressive load for at least a 5-second period. It has been found that the application of the compressive loads for longer periods of time such as 30 seconds do not yield significant reductions in the size of the compacted-folded air bag.

It has been found that the above-described process can be enhanced by heating the fabric during the pressing operation. With reference to the air bag material described in conjunction with FIG. 3, it has been found that by heating the air bag material to a temperature approximately 177° C. (350° F.) further reductions to bag size can be achieved. As such, the present invention contemplates adding an additional process step which can be implemented by placing the initially folded air bag in a heated environment for a time sufficient that the air bag material stabilizes at desired temperature. Upon compressively loading the heated/folded air bag, testing has shown that the resulting height dimension of the air bag has been reduced 40% as compared to the same air bag without loading and heating. It should be appreciated that the process of heating the air bag material can be done prior to or during the time the compressive load is placed on the folded air bag. By utilizing the above-described temperature/pressure fabrication steps, the folded air bag appears to achieve a permanent set without deterioration in the tensile strength of the air bag material. It can be appreciated that the air bag can be subjected to a variety of temperature-time profiles and means for increasing its temperature. As an example, the ambient air may be heated to directly heat the material and/or the various pressing dies heated to heat the material by convection.

Many changes and modifications in the above described embodiment of the invention can, of course, be carried out without departing from the scope thereof. Accordingly, that scope is intended to be limited only by the scope of the appended claims.

We claim:

1. An air bag or cushion (60), comprising flexible material, defining a first volume when inflated by inflation gas, a second volume when in a non-inflated initially folded configuration having at least two proximately positioned folds in the material, and a folded, non-inflated reduced volume configuration, the reduced volume configuration achieved by loading the initially folded configuration to simultaneously compress the at least two folds.

2. The air bag as defined in claim 1 wherein the loading is at a level less than that which would cause a reduction in the tensile strength of the material defining the air bag and sufficient to cause the material to achieve a set.

3. The air bag as defined in claim 2 wherein the initially folded configuration is compressed at a load range of up to 10,000 pounds per square inch.

4. The air bag as defined in claim 2 wherein the compressive loading is applied for a predetermined time period.

5. The air bag as defined in claim 1 wherein the reduced volume configuration is further achieved by heating the air bag material.

6. The air bag as defined in claim 5 wherein the air bag material is heated to a temperature of approximately 177° C. (350° F).

7. The air bag (60) as defined in claim 5 wherein the material is heated prior to the application of the compressive load.

8. The air bag (60) as defined in claim 5 wherein the material is heated during the application of the load.

9. The air bag (60) as defined in claim 1 wherein the loading of the air bag is achieved by compressing the initially folded air bag between two substantially parallel plates (62,64).

10. The air bag (60) as defined in claim 9 wherein the loading of the air bag is achieved by placing the initially folded air bag into a lower fixture including a cavity having dimensions substantially equal to the planar folded size of the initially folded air bag and compressively loading the air bag while in the lower fixture.

11. The air bag (60) as defined in claim 10 wherein the lower fixture is a housing portion of an air bag module (20).

12. A method of forming an air bag (60) comprising flexible material, into a desired folded configuration including at least two proximately positioned folds in the material, comprising the steps of:
   12.1 initially folding the air bag material to a configuration having desired dimensions;
   12.2 compressively loading the folded material so as to simultaneously compress the at least two folds.

13. The method as defined in claim 12 wherein the step of loading includes loading the material to a level such that a set is introduced into the material.

14. The method as defined in claim 13 wherein the step of loading includes applying the load for a predetermined time period.

15. The method as defined in claim 13 wherein the step of loading includes loading the material when same is at an increased temperature.

16. An assembly (20) usable in an occupant safety restraint system comprising:

an air bag means (60), comprising flexible material, defining a first volume when inflated by inflation gas, a second volume when in a non-inflated, initially folded configuration having at least two proximately positioned folds in the material, and a reduced volume configuration achieved by loading the initially folded configuration to simultaneously compress the at least two folds.

17. The assembly (20) as defined in claim 16 comprising:

first means (28,32) for enclosing the air bag (60), including a flexible, tearable front cover (28); wherein the air bag means disposed within the first means in a sufficiently compact form so as not to outwardly deform the front cover.

18. The assembly as defined in claim 17 wherein the first means includes a housing (32) into which the air bag is received wherein the front cover (28) cooperates with the housing (32) to enclose the air bag (60).

19. The assembly (24) as defined in claim 18 wherein the retainer means (34) secures a portion of the air bag (60) against the housing.

20. The assembly as defined in claim 19 including second means (24) for supporting the first means and air bag means (60) in an orientation to provide protection for an occupant.

21. The assembly (20) as defined in claim 16 including wherein the reduced volume configuration is further achieved by loading the air bag while same is at an increased temperature to permit material forming the air bag to achieve a set.

22. The assembly as defined in claim 21 wherein the reduced volume configuration of the air bag (60) is achieved by placing the air bag in the housing (32) in its initial folded configuration and compressively loading the air bag relative to the housing.

* * * * *